Jan. 29, 1929.　　　　　　　　　　　　　　　　　　　　　　　1,700,157
C. CORLISS
SUPPORTING DEVICE FOR DRAWINGS AND THE LIKE
Filed May 12, 1928
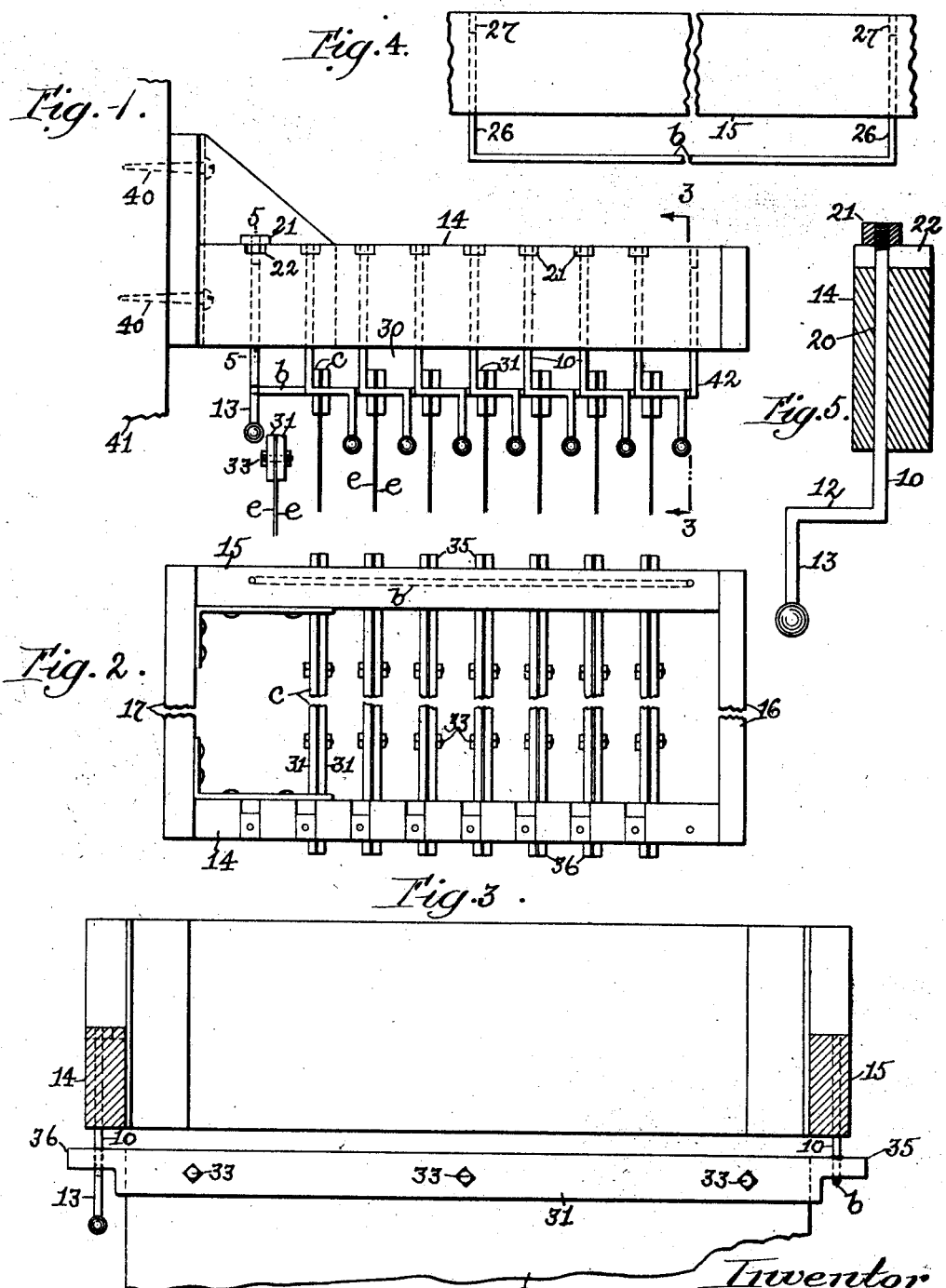

Patented Jan. 29, 1929.

1,700,157

UNITED STATES PATENT OFFICE.

CYRUS CORLISS, OF BOSTON, MASSACHUSETTS.

SUPPORTING DEVICE FOR DRAWINGS AND THE LIKE.

Application filed May 12, 1928. Serial No. 277,323.

This invention relates to a supporting device for a holder for drawings, blue prints, papers, and the like, and has for its object to provide a simple and efficient supporting device upon which the holder may be suspended and retained against accidental displacement and from which the holder may be readily removed when it is desired to use the drawing, etc, carried by the holder.

The supporting device may and preferably will be constructed as will be described, so that a plurality of holders may be suspended therefrom and be individually removable.

The particular features of the invention will be pointed out in the claims at the end of this specification.

Fig. 1 is a side elevation of a supporting device embodying this invention;

Fig. 2, a plan of the device shown in Fig. 1;

Fig. 3, a cross section on the line 3—3, Fig. 1;

Fig. 4, an elevation of one of the side bars of the supporting device shown in Fig. 1, and Fig. 5, a detail in section on the line 5—5, Fig. 1, to be referred to.

The supporting device embodying this invention is provided with two substantially parallel members $a$, $b$ spaced apart, and upon which the holder $c$ for a plurality of drawings, blue prints, and the like $c$ are suspended.

In the present instance, the member $a$ is rotatable and the member $b$ is stationary.

The member $a$ is preferably made as herein shown and consists of a metal rod bent or shaped to form an upright arm 10 and a horizontal arm 12, which latter is extended from the lower end of the upright arm 10 and preferably has extended from its outer end a second vertical arm 13 which is substantially parallel to the arm 10 and constitutes a handle by which the member $a$ may be manipulated.

The upright arm 10 is extended up through a side bar 14 of an open frame having a side bar 15 parallel to the side bar 14 and end bars 16, 17, which are suitably secured to said side bars.

The upright arm 10 is extended through a suitable hole 20 in the side bar 14 and is rotatable therein, and is provided at its upper end with a head 21, preferably oblong in shape and adapted in one position to fit into an oblong slot 22 in the upper surface of the side bar 14 and extended transversely of said bar from the front or outer face thereof, in which position the head 21 acts as a key to lock the upright arm 10 to the side bar 14 and prevent the said arm from being accidentally turned.

The upper end of the arm 10 is preferably screw-threaded and the head 21 is screwed thereon.

The head 21 is arranged on the arm 10 substantially at right angles to the horizontal arm 12 (see Figs. 1 and 5), so that when the head 21 is in its slot 22 in the side bar 14, the horizontal arm 12 is substantially parallel with said side bar, as represented in Fig. 1, and so that when the head 21 is raised out of its slot 22 and is turned so as to extend across the said slot and have its opposite ends rest upon the upper surface of the side bar 14, as represented at the left in Fig. 1, and also in Fig. 5, the horizontal arm 12 will be substantially at right angles to the side bar 14.

The rotatable supporting device carried by the side bar 14 of the supporting frame co-operates with the stationary supporting device $b$ affixed to the side bar 15 of the supporting frame and depending therefrom.

The stationary supporting device $b$ may be a wire or rod having upright arms 26 at its ends, which are inserted into suitable holes 27 in the side bar 15, and the rod $b$ is preferably made of a sufficient length to co-operate with a plurality of rotatable supporting members $a$.

In the present instance, the side bar 14 has suspended from it eight rotatable supporting devices $a$, which are arranged with relation to one another, so that the horizontal arm 12 of a supporting device when in its operative position, is in close proximity to the upright arm 10 of the next adjacent rotatable device to form a closure member for the space 30 between the upright arms 10 of adjacent supporting devices, which closure member serves to support one end of the holder $c$ for a plurality of drawings, blue prints and the like $e$. The opposite end of the holder is sustained by the stationary supporting device $b$ attached to the side bar 15.

The holder $c$ for the drawings $e$ may be of any suitable or desired construction, and in the present instance is shown as composed of two bars 31 between which the upper ends of the drawings $e$ are clamped by means of bolts 33 or otherwise.

The bars 31 of the holder $c$ may and preferably will be provided at their opposite ends with extensions or fingers 35, 36, which are narrower than the bars 31 and one of said fingers as 35 is designed to rest upon the stationary member *b* and the other finger 36 is designed to rest upon the horizontal arm 12 of the rotatable supporting device *a* when the latter is in its operative position and locked to the side bar 14 of the supporting frame.

By reference to Figs. 1 and 3, it will be observed that the horizontal arm 12 when in its closed or operative position locks the holder against removal until the said arm is turned from its closed or operative position substantially parallel with the side bar 14 into its open or inoperative position substantially at right angles to the said side bar.

This open or inoperative position is represented in Fig. 1 in the case of the extreme left-hand-endmost rotatable supporting device *a* and also in Fig. 5.

The rotatable supporting device *a* is moved into its open position by the operator moving the upright arm 10 upwardly until the key 21 has been lifted out of its slot 22 in the upper surface of the side bar 14, and then turning the arm 10 a quarter-turn to move the horizontal arm 12 outwardly into a position substantially at right angles to the side bar 14, and thus bring the key 21 across the slot 22, as represented in Figs. 1 and 5.

While the rotatable supporting device *a* is being thus moved, the operator supports the outer end of the holder *c* with one hand, and when the arm 12 has been turned into its open position, the operator moves the holder *c* and the drawings attached thereto laterally with respect to the supporting frame, and in practice carries the holder and drawings to the place where the drawing is to be used.

When the operator is through with the drawing, it is returned to the rack or frame, and is inserted into the space from which it was removed, the rear finger 35 on the holder *c* being first slipped over upon the stationary member *b*, and the front finger 36 being then lifted sufficiently to allow the horizontal arm 12 of the rotatable device *a* to be turned into its closed position below the front finger 36, so that when the latter is released by the operator it will rest upon the arm 12.

The frame or rack carrying the supporting devices *a*, *b* may be secured by screws 40 or otherwise to the wall 41 of a building.

A device of the character herein shown is highly useful in shops, factories, field offices, and like places where a relatively large number of blue prints, tracings and other drawings relating to the same or different subject-matter are employed, and affords a convenient and inexpensive means for keeping the blue prints, etc. so that they are readily accessible for use and are not liable to get lost when used.

In the present instance, a stationary supporting member *b* is shown on one side of the frame, but it is not desired to limit the invention in this respect as both sides of the supporting frame may be provided with the rotatable supporting devices *a* in case it is desired to have the holders *c* and the drawings attached thereto removable from either side of the frame.

The arm 12 of the right-hand-end rotatable device *a*, viewing Fig. 1, may co-operate with a straight rod 42 to form the space 30.

One embodiment of the invention is herein shown, but it is not desired to limit the invention to the particular construction shown.

What is claimed is:

1. In a supporting device of the character described, in combination, a frame provided with side bars spaced apart, a supporting member secured to one of said side bars and upon which one end of a plurality of holders for drawings and the like may be supported, a plurality of supporting members rotatably mounted on the other of said side bars and movable into an operative position substantially parallel with the first-mentioned supporting member to support the opposite ends of said holders and movable into an inoperative position substantially at right angles to said operative position to permit the holders co-operating therewith to be removed from the supporting frame, and means for locking said rotatable supporting members in their closed position.

2. In a supporting device of the character described, in combination, a bar provided in its upper surface with a slot extended transversely thereof, a supporting member having a vertical arm extended upwardly through said bar into said slot and having a horizontal arm extended from the said vertical arm below said bar and rotatable with the vertical arm into a position substantially parallel with said bar and into a position substantially at right angles thereto, and a key on said vertical arm movable into and out of said slot.

3. In a supporting device of the character described, in combination, a bar, a plurality of supporting members rotatably mounted on said bar and provided with substantially horizontal arms movable from an operative position substantially parallel with said bar into an inoperative position substantially at right angles thereto.

4. In a supporting device of the character described, in combination, a bar, a plurality of supporting members rotatably mounted on said bar and provided with substantially horizontal arms movable from an operative position substantially parallel with said bar into an inoperative position substantially at right angles thereto, and means for locking said supporting members in their operative position.

5. In a supporting device of the character described, in combination, a bar, a plurality of supporting members rotatably mounted on said bar and having vertical and horizontal arms, the horizontal arm on one member co-operating with the vertical arm of an adjacent member to close the space between the vertical arms of adjacent members when said horizontal arm is in its operative position and to open said space when said horizontal arm is in its inoperative position.

In testimony whereof, I have signed my name to this specification.

CYRUS CORLISS.